(12) United States Patent
Yan et al.

(10) Patent No.: US 11,168,738 B2
(45) Date of Patent: Nov. 9, 2021

(54) STRUT BEARING

(71) Applicant: Schaeffler Technologies AG & Co. KG, Herzogenaurach (DE)

(72) Inventors: Liuqing Yan, Shanghai (CN); Yong Wu, Suzhou (CN); Christian Nuissl, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/772,824

(22) PCT Filed: Dec. 20, 2017

(86) PCT No.: PCT/CN2017/117575
§ 371 (c)(1),
(2) Date: Jun. 15, 2020

(87) PCT Pub. No.: WO2019/119320
PCT Pub. Date: Jun. 27, 2019

(65) Prior Publication Data
US 2021/0172478 A1 Jun. 10, 2021

(51) Int. Cl.
*F16C 19/16* (2006.01)
*F16C 35/04* (2006.01)
(Continued)

(52) U.S. Cl.
CPC .......... *F16C 35/042* (2013.01); *F16C 17/20* (2013.01); *F16C 19/163* (2013.01); *F16C 33/80* (2013.01);
(Continued)

(58) Field of Classification Search
CPC . B60G 15/068; B60G 2204/418; F17C 19/10; F17C 19/163; F17C 33/586;
(Continued)

(56) References Cited

U.S. PATENT DOCUMENTS 4,541,744 A * 9/1985 Lederman ............ B60G 15/068
384/607
4,699,530 A * 10/1987 Satoh ................... B60G 15/068
280/124.155
(Continued)

FOREIGN PATENT DOCUMENTS

CN 102202922 A 9/2011
CN 102498003 A 6/2012
(Continued)

*Primary Examiner* — Phillip A Johnson
(74) *Attorney, Agent, or Firm* — Reid Baldwin

(57) ABSTRACT

This disclosure provides a strut bearing for MacPherson strut suspensions including a cap, a guide ring, and a bearing arrangement located between the cap and the guide ring. The cap comprises a first hook on an inner side in a radial direction of the strut bearing and a third hook on an outer side in the radial direction, and the guide ring comprises a second hook on the inner side engaged with the first hook and a fourth hook on the outer side engaged with the third hook; the first and second hooks form an inner snap connection extending circumferentially, and the third and fourth hooks form an outer snap connection extending circumferentially.

17 Claims, 4 Drawing Sheets

(51) Int. Cl.
*F16C 17/20* (2006.01)
*F16C 33/80* (2006.01)

(52) U.S. Cl.
CPC ...... *F16C 2226/74* (2013.01); *F16C 2326/05* (2013.01)

(58) Field of Classification Search
CPC .. F17C 33/76; F17C 33/7823; F17C 33/7886; F17C 33/80; F17C 35/042; F17C 35/067; F17C 43/04; F17C 2326/05
See application file for complete search history.

(56) References Cited

U.S. PATENT DOCUMENTS

| | | | | |
|---|---|---|---|---|
| 4,995,737 | A * | 2/1991 | Moller | F16C 33/761 384/607 |
| 6,257,605 | B1 * | 7/2001 | Zernickel | B60G 15/063 267/220 |
| 6,296,396 | B1 * | 10/2001 | Schwarzbich | B60G 15/067 384/480 |
| 2004/0104552 | A1 | 6/2004 | Nicot et al. | |
| 2010/0187778 | A1 | 7/2010 | Grau et al. | |
| 2010/0308555 | A1 | 12/2010 | Lenon et al. | |
| 2011/0291337 | A1 | 12/2011 | Viault et al. | |
| 2012/0161414 | A1 * | 6/2012 | Scolaro | B60G 15/068 280/124.155 |
| 2013/0270790 | A1 | 10/2013 | Morishige et al. | |
| 2013/0313766 | A1 | 11/2013 | Bussit et al. | |
| 2015/0367698 | A1 | 12/2015 | Stautner et al. | |

FOREIGN PATENT DOCUMENTS

| | | | |
|---|---|---|---|
| CN | 103314224 A | 9/2013 | |
| CN | 103423312 A | 12/2013 | |
| CN | 104936806 A | 9/2015 | |
| CN | 105705822 A | 6/2016 | |
| CN | 106163840 A | 11/2016 | |
| CN | 107009836 A | 8/2017 | |
| DE | 8906357 U1 | 7/1989 | |
| DE | 10047773 A1 | 4/2002 | |
| DE | 112010005238 T5 | 11/2012 | |
| DE | 102012215912 A1 | 3/2014 | |
| DE | 102013222727 A1 | 5/2015 | |
| DE | 102015209776 A1 * | 12/2016 | ........... B60G 15/068 |
| DE | 102016224439 A1 | 6/2017 | |
| FR | 2630375 B1 | 8/1990 | |
| GB | 2217663 A | 11/1989 | |
| GB | 2247053 A | 2/1992 | |
| KR | 20160059092 A | 5/2016 | |
| KR | 20170086371 A | 7/2017 | |
| KR | 20170103570 A | 9/2017 | |
| WO | 2011026703 A1 | 3/2011 | |

* cited by examiner

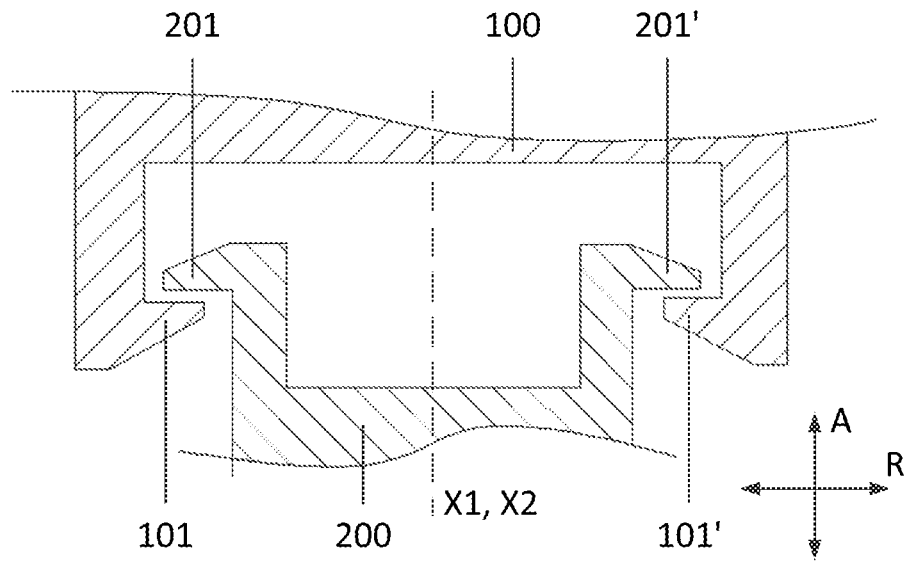
Fig. 1A – PRIOR ART
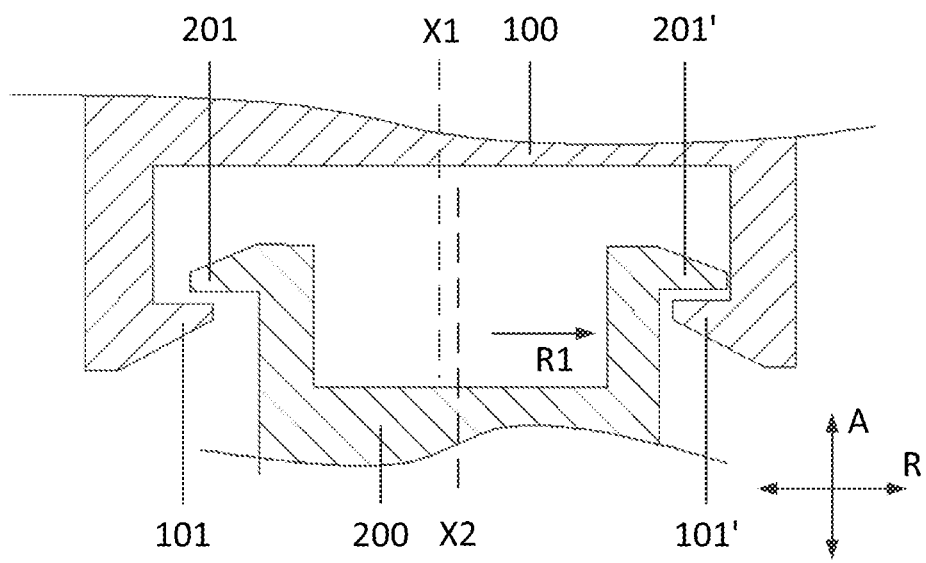
Fig. 1B – PRIOR ART

STRUT BEARING

CROSS-REFERENCE TO RELATED APPLICATIONS

This application is the U.S. National Phase of PCT Appln. No. PCT/CN2017/117575 filed Dec. 20, 2017, the entire disclosure of which is incorporated by reference herein.

TECHNICAL FIELD

This disclosure relates to a strut bearing for MacPherson strut suspensions.

BACKGROUND

As a strut bearing for MacPherson strut suspensions, a typical thrust ball bearing consisting of a cap, a guide ring, a cage, an upper washer, a lower washer and a set of balls is known. The thrust ball bearing normally has a seal outside in a radial direction and a snap connection between the cap and the guide ring inside as disclosed in CN105705822A (or WO2015/067251A1) and DE102012215912A1, which are incorporated herein by reference for all purposes.

In the last few years, the requirement of the pull apart force has been increased step by step. For this reason the risk of failing to fulfill the pull apart test and the risk of getting a loose connection under a large working load are increased. The structure of single snap connection is functionally limited.

As shown in FIG. 1A, in a nominal position without any displacements, an axial line X1 of the cap 100 and an axial line X2 of the guide ring 200 coincide with each other, a first hook 101 of the cap 100 on one side of the axial line X1 and a second hook 201 of the guide ring 200 on the one side have a good connection, and the first hook 101' of the cap 100 on the other side of the axial line X1 and the second hook 201' of the guide ring 200 on the other side also have a good connection.

FIG. 1A is a kind of outer side snap connection. It should be understood that the first hook 101 and 101' is one circumferential lower hook of the cap 100, and the reference numbers 101 and 101' is only used to distinguish different parts of the same circumferential hook of the cap 100, and that the second hook 201 and 201' is one circumferential upper hook of the guide ring 200, and the reference numbers 201 and 201' is only used to distinguish different parts of the same circumferential hook of the guide ring 200.

FIG. 1B shows that there is a displacement in the radial direction R between the cap 100 and the guide ring 200, to be specific, the guide ring 200 has moved with respect to the cap 100 in a direction RI. In such a case, the first hook 101' of the cap 100 and the second hook 201' of the guide ring 200 has a good connection, but the connection between the first hook 101 of the cap 100 and the second hook 201 of the guide ring 200 is poor and there is a risk of loose connection during operation of the thrust ball bearing. Loose connection may also occur when the cap 100 and/or the guide ring 200 are tilted with respect to an axial direction A.

In addition, unexpected cracks and failures may happen for balls getting out of the cage and raceways when loose connection occurs.

SUMMARY

In view of the above condition, this disclosure provides a strut bearing for MacPherson strut suspensions.

This disclosure provides a strut bearing for MacPherson strut suspensions including a cap, a guide ring, and a bearing arrangement located between the cap and the guide ring. The cap may comprise an inner lower hook on an inner side in a radial direction of the strut bearing and an outer lower hook on an outer side in the radial direction, and the guide ring may comprise an inner upper hook on the inner side engaged with the inner lower hook and an outer upper hook on the outer side engaged with the outer lower hook. The inner lower and inner upper hooks may form an inner snap connection extending circumferentially, and the outer lower and outer upper hooks may form an outer snap connection extending circumferentially.

Further features of this disclosure will become apparent from the following description of exemplary embodiments with reference to the attached drawings.

BRIEF DESCRIPTION OF THE DRAWINGS

FIG. 1A conceptually shows a thrust ball bearing in a nominal position in the prior art.

FIG. 1B conceptually shows the thrust ball bearing in FIG. 1A when a displacement in a radial direction between a cap and a guide ring occurs.

DETAILED DESCRIPTION

The following describes in detail preferable exemplary embodiments of this disclosure with reference to the attached drawings.

Figure 2:
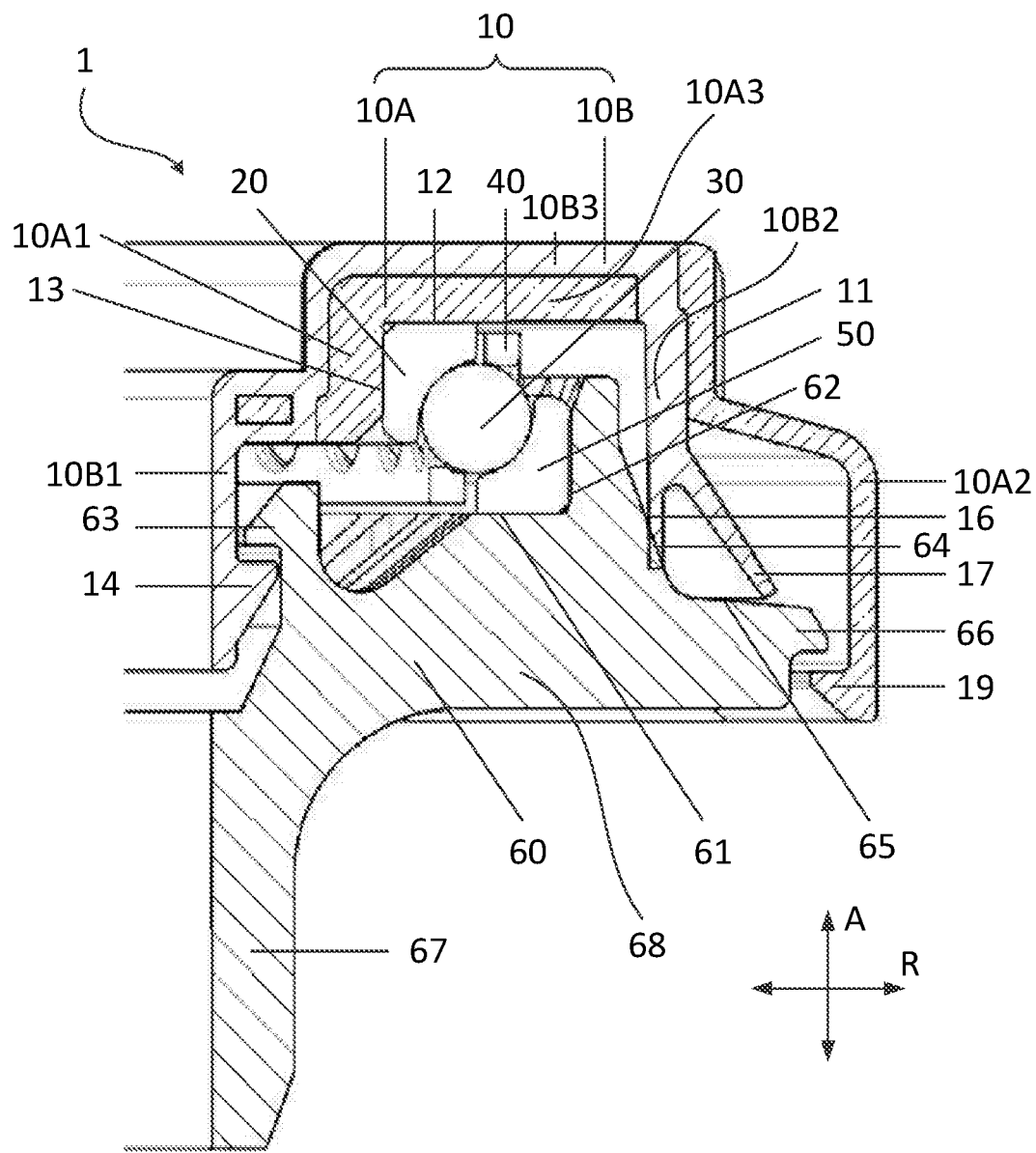
FIG. 2 partially shows a cross section in an axial direction of a strut bearing in a first embodiment of this disclosure.

As shown in FIG. 2, a first embodiment provides a thrust ball bearing 1. The thrust ball bearing 1 has substantially a rotationally symmetric structure, and FIG. 2 shows only part of its cross section along an axial direction A of the thrust ball bearing 1. The thrust ball bearing 1 comprises a cap 10, a guide ring 60 and a bearing arrangement. The bearing arrangement may comprise an upper washer 20, a set of balls 30, a cage 40, and a lower washer 50.

The cap 10 may be mounted on a top mount (not shown) by fit ribs 11 on the cap 10. The cap 10 may be made of a combination of two materials, that is, a hard part 10A made of hard polymer and a soft part 10B made of soft polymer. Both the upper washer 20 and the lower washer 50 may be made of steel and angularly contact with the balls 30. The upper washer 20 is seated in a washer seat 12 by interference fit with washer fit ribs 13 on the hard part 10A. The balls 30 which may be made of steel are seated in pockets of the cage 40. The cage 40 which may be made of hard polymer is suspending between the upper washer 20 and the lower washer 50. The lower washer 50 is seated in a washer seat 61 by interference fit with washer fit ribs 62 on the guide ring 60 which may be made of hard polymer.

An inner snap connection in a radial direction R of the thrust ball bearing 1 is constituted by an inner lower hook 14 formed on the soft part 10B of the cap 10 and an inner upper hook 63 formed on the guide ring 60. An outer snap connection in the radial direction R is constituted by an outer lower hook 19 formed on the hard part 10A of the cap 10 and an outer upper hook 66 formed on the guide ring 60. The inner lower hook 14 and the outer lower hook 19 each have engaging surfaces facing one side (the upper side in FIG. 2) in the axial direction A, and the inner upper hook 63 and the outer upper hook 66 each have engaging surfaces facing the other side (the lower side in FIG. 2) in the axial direction A.

The soft part 10B, in the cross section in FIG. 2, may have approximately an inverted U-shape, which has a first leg 10B1, a second leg 10B2 and a bottom 10B3. It should be understood that, along the circumferential direction of the thrust ball bearing 1, openings may form on the soft part 10B, and the hard part 10A may occupy such openings to enhance adhesion between the soft part 10B and the hard part 10A. The inner lower hook 14 may be formed on the distal end of the first leg 10B1. One or more sealing lips 16, 17 may be formed on the second leg 10B2. The inner sealing lip 16 in the radial direction R contacts with a sealing bevel 64 on the guide ring 60. The outer sealing lip 17 in the radial direction R does not contact with, but is very close to a splash guard 65 on the guide ring 60. The sealing lips 16, 17, the sealing bevel 64, the splash guard 65, the outer lower hook 19 and the outer upper hook 66 can form a labyrinth seal.

The hard part 10A, in the cross section in FIG. 2, may also have approximately an inverted U-shape, which has a first leg 10A1, a second leg 10A2 and a bottom 10A3. The first leg 10A1, the bottom 10A3 and a base part of the second leg 10A2 are bonded to a base part of the first leg 10B1, the bottom 10B3, and a base part of the second leg 10B2 of the soft part 10B, respectively. The outer lower hook 19 may be formed on the distal end of the second leg 10A2.

The guide ring 60, in the cross section in FIG. 2, may have approximately an inverted L-shape, which has a first arm 67 extending substantially in the axial direction A and a second arm 68 extending substantially in the radial direction R. The inner upper hook 63 and the outer upper hook 66 are formed on the base and distal ends of the second arm 68, respectively.

The washer seat 12 is formed at a corner between the first leg 10A1 and the bottom 10A3, and the washer seat 61 is formed at a corner on the middle part of the second arm 68. The washer seats 12 and 61 face each other diagonally, in a direction tilted with respect to the radial direction R and the axial direction A. The balls 30 therefore are supported by the upper washer 20 and the lower washer 50 in the direction tilted with respect to the radial direction R and the axial direction A.

The sealing bevel 64 and the splash guard 65 may be formed on the part of the second arm 68 near the outer upper hook 66.

The hard polymer may be a plastic such as polyamide, and can also be reinforced by a fiber such as glass fiber. As examples, PA66-GF25 and PA66-GF35 can be used as the hard polymer. The soft polymer may be a thermoplastic elastomer or rubber, such as thermoplastic polyurethane (TPU) or nitrile butadiene rubber (NRB).

A second embodiment has a similar concept as that of the first embodiment and only the differences therebetween will be described hereinafter.

Figure 3:
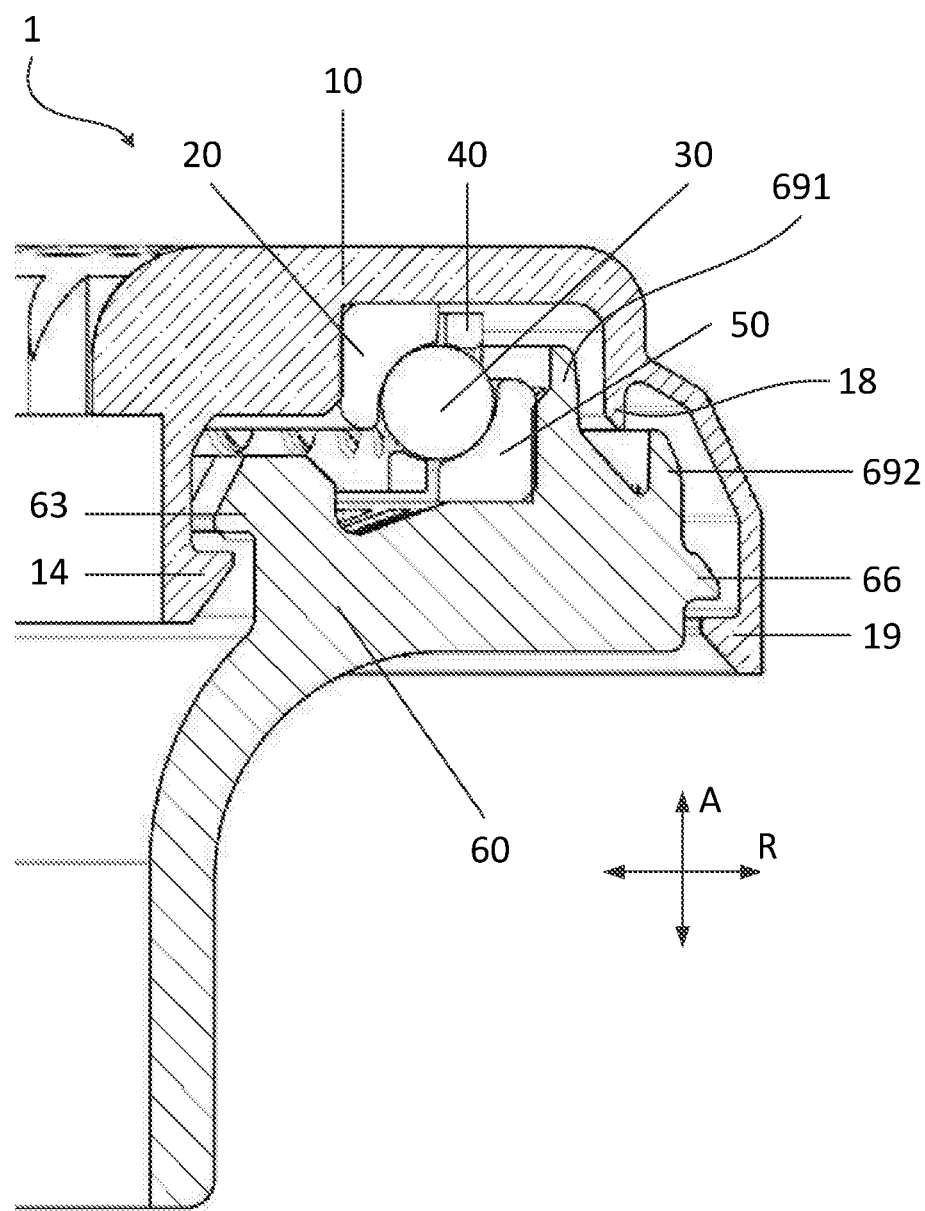
FIG. 3 partially shows a cross section in the axial direction of a strut bearing in a second embodiment of this disclosure.

As shown in FIG. 3, in this second embodiment, the cap 10 is made of hard polymer and both of the inner lower hook 14 and the outer lower hook 19 are made of the hard polymer.

In this embodiment no soft part is incorporated in the cap 10 or the guide ring 60. A second sealing finger 18 is formed on the cap 10 near the outer lower hook 19 and projects towards the guide ring 60. A first sealing finger 691 and a third sealing finger 692 are formed on the guide ring 60 near the outer upper hook 66 and projects towards the cap 10. Preferably, the second sealing finger 18 points to a valley between the first sealing finger 691 and the third sealing finger 692, therefore a labyrinth seal is formed near the outer snap connection.

The operation of the thrust ball bearing 1 regarding the snap connections will be described hereinafter.

Figure 4A:
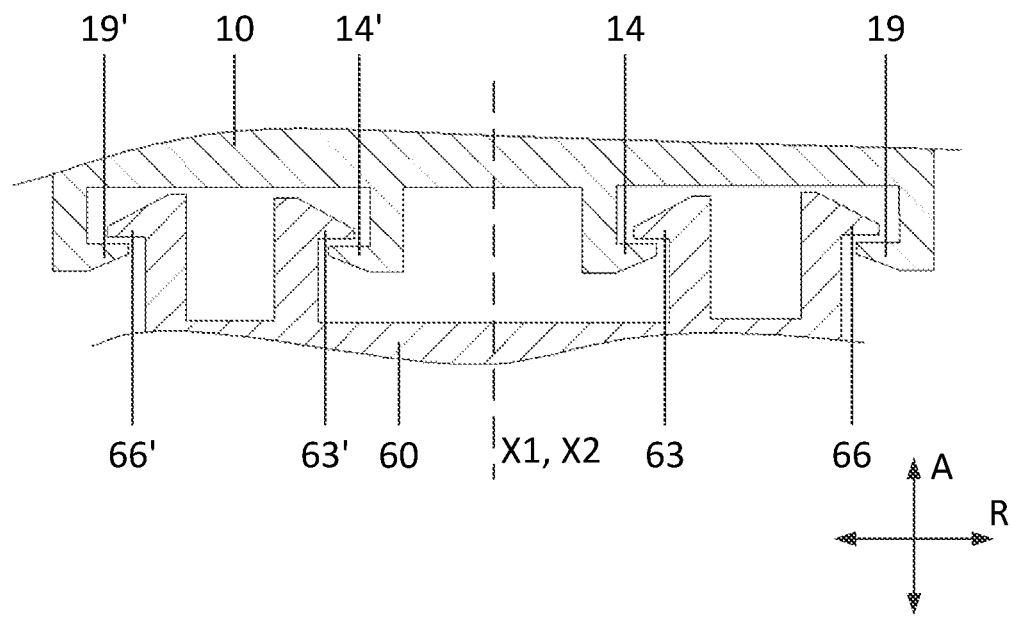
FIG. 4A conceptually shows a strut bearing according to this disclosure in a nominal position.

As shown in FIG. 4A, in a nominal position without any displacements, an axial line X1 of the cap 10 and an axial line X2 of the guide ring 60 coincide with each other, the inner lower hook 14, 14' of the cap 10 and the inner upper hook 63, 63' of the guide ring 60 have a good connection, and the outer lower hook 19, 19' of the cap 10 and the outer upper hook 66, 66' of the guide ring 60 also have a good connection.

Figure 4B:
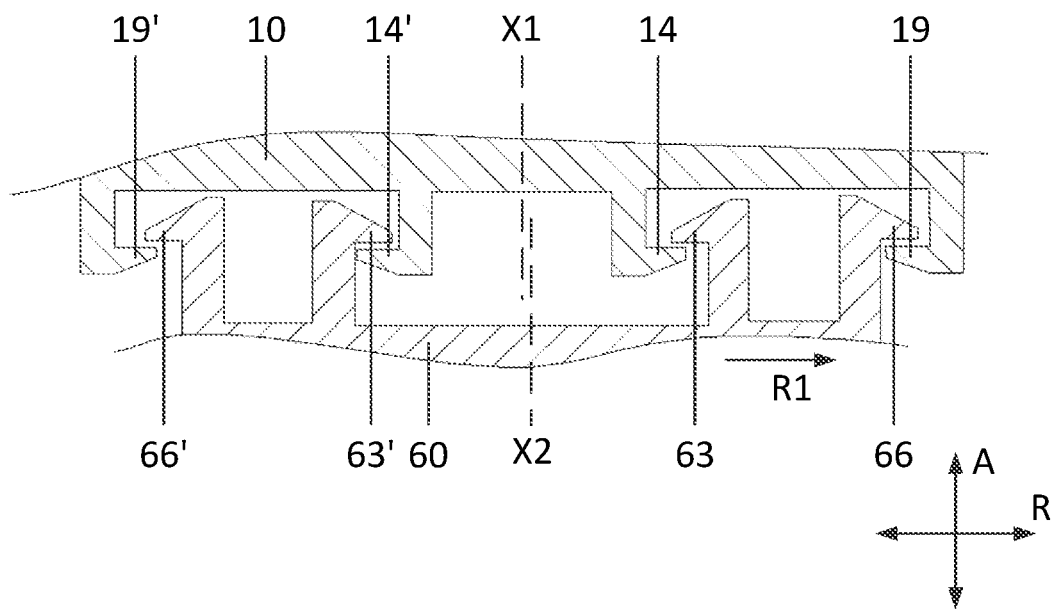
FIG. 4B conceptually shows the strut bearing according to this disclosure when a displacement in a radial direction between a cap and a guide ring occurs.

It should be understood that only the cap 10 and the guide ring 60 are conceptually shown in FIGS. 4A and 4B, and the bearing arrangement is omitted.

It should be understood that the inner lower hook 14 and 14' is one circumferential hook of the cap 10, and the reference numbers 14 and 14' is only used to distinguish different parts of the same circumferential hook of the cap 10, that the inner upper hook 63 and 63' is one circumferential hook of the guide ring 60, and the reference numbers 63 and 63' is only used to distinguish different parts of the same circumferential hook of the guide ring 60. The reference numbers 19 and 19', and the reference numbers 66 and 66' are the same.

FIG. 4B shows that there is a displacement in the radial direction R between the cap 10 and the guide ring 60, to be specific, the guide ring 60 has moved with respect to the cap 10 in a direction R1. In such a case, the outer snap connection on one side of the axial line X1 between the outer lower hook 19' of the cap 10 and the outer upper hook 66' of the guide ring 60 is poor, as well as the inner snap connection on the other side of the axial line X1 between the inner lower hook 14 of the cap 10 and the inner upper hook 63 of the guide ring 60. However, the inner snap connection on the one side between the inner lower hook 14' of the cap 10 and the inner upper hook 63' of the guide ring 60 is in good condition, as well as the outer snap connection on the other side between the outer lower hook 19 of the cap 10 and the outer upper hook 66 of the guide ring 60. In other words, good snap connections are obtained in both sides of the axial lines X1 and X2, such that the cap 10 and the guide ring 60 can not be separated from each other in the axial direction A.

The effects of this disclosure are described hereinafter.

1. The thrust ball bearing 1 can be used for MacPherson strut suspensions as a strut bearing. Double snap connections increase the pull apart force by more overlapping area, and thus make the bearing to be more stable and have less risk of failure than the traditional strut bearing.

2. Double snap connections arranged on both the inner side and the outer side decrease the risk of loose connection under a radial displacement or tilting during operation, and thus make the bearing to be more stable and have longer lifetime than the traditional strut bearing.

3. The outer snap connection reinforces the labyrinth sealing function and protects the sealing lips, because less water or dust will come onto the sealing lips.

While this disclosure has been described with reference to exemplary embodiments, it is to be understood that this disclosure is not limited to the disclosed exemplary embodiments. The scope of the following claims is to be accorded the broadest interpretation so as to encompass all modifications and equivalent structures and functions such as the followings.

(1) For example, the double snap connections can also be used in strut bearings having other structures. KR20170086371A and KR20170103570A, for example, disclose strut bearing having other structures, which are incorporated herein by reference for all purposes.

(2) The strut bearing of this disclosure is not limited to the thrust ball bearing, it can also be, for example, thrust needle roller bearings, sliding bearings or rolling bearings. Therefore, other types of rolling element or a sliding bearing piece may be used instead of the balls 30. CN103314224A (or US2013270790 A1) and CN104936806A (or US2015367698 A1), for example, disclose sliding bearings, and CN103423312A (or US2013313766 A1), for example, discloses a rolling bearing, which are incorporated herein by reference for all purposes.

(3) In the first embodiment, the sealing lips 16, 17 and the inner lower hook 14 are made of soft polymer, in such a case a good sealing effect can be obtained. In the second embodiment, the two snap connections are both made of the hard polymer and therefore a larger pull apart force can be withstood.

However, this disclosure is not limited to such conditions. Both the snap connections can be made of hard polymer while the sealing lips are made of soft polymer such as rubber.

The sealing lips can also be formed or provided on the guide ring 60.

LIST OF REFERENCE NUMBERS

100 cap
101, 101' first hook of the cap
200 guide ring
201, 201' second hook of the guide ring
X1 axial line of the cap
X2 axial line of the guide ring
A axial direction
R radial direction
1 thrust ball bearing
10 cap
10A hard part
10A1 first leg of the hard part
10A2 second leg of the hard part
10A3 bottom of the hard part
10B soft part
10B1 first leg of the soft part
10B2 second leg of the soft part
10B3 bottom of the soft part
11 fit rib
12 washer seat
13 fit rib
14, 14' (first) inner lower hook
16 inner sealing lip
17 outer sealing lip
18 second sealing finger
19, 19' (third) outer lower hook
20 upper washer
30 ball
40 cage
50 lower washer
60 guide ring
61 washer seat
62 fit rib
63, 63' (second) inner upper hook
64 sealing bevel
65 splash guard
66, 66' (fourth) outer upper hook
67 first arm
68 second arm
691 first sealing finger
692 third sealing finger

What is claimed is:

1. A strut bearing for MacPherson strut suspensions comprising a cap, a guide ring, and a bearing arrangement located between the cap and the guide ring,
wherein the cap comprises a first hook on an inner side in a radial direction of the strut bearing and a third hook on an outer side in the radial direction, and the guide ring comprises a second hook on the inner side engaged with the first hook and a fourth hook on the outer side engaged with the third hook; the first and second hooks form an inner snap connection extending circumferentially, and the third and fourth hooks form an outer snap connection extending circumferentially, and
wherein the cap comprises a soft part and a hard part bonded with each other, wherein the first hook and at least one sealing lip are formed on the soft part and the third hook is formed on the hard part.

2. The strut bearing according to claim 1, wherein in half of the cross section along the radial direction, the cap has substantially an inverted U-shape, and the first hook and the third hook are formed on the distal ends of two legs of the U-shape, respectively.

3. The strut bearing according to claim 1, wherein the soft part is made of soft polymer and the hard part is made of hard polymer.

4. The strut bearing according to claim 1, wherein the hard part and the soft part are bonded with each other at least on the bottom of the U-shape.

5. The strut bearing according to claim 1, wherein in half of the cross section along the radial direction, the guide ring has substantially an inverted L-shape, and the second and fourth hooks are formed on a base and distal ends of one arm of the inverted L-shape, respectively.

6. The strut bearing according to claim 1, wherein a labyrinth seal is formed by the third and fourth hooks and one or more sealing lips.

7. The strut bearing according to claim 1, wherein the first and third hooks face one side in an axial direction of the strut bearing, and the second and fourth hooks face the other side in the axial direction.

8. The strut bearing according to claim 1, wherein the first and third hooks are spaced apart from each other and define a gap therebetween, the second and fourth hooks at least partly enter into the gap and engage with the first and third hooks accordingly.

9. The strut bearing according to claim 1, wherein the bearing arrangement comprises an upper washer mounted on the cap by interference fit, a lower washer mounted on the guide ring by interference fit, and a set of balls supported by the upper washer and the lower washer.

10. The strut bearing according to claim 1, wherein a labyrinth seal is formed by the third and fourth hooks and one or more sealing fingers formed on the cap and/or the guide ring.

11. A MacPherson strut comprising:
a cap having a first radially inward facing hook and a first radially outward facing hook;
a guide ring having a second radially inward facing hook engaging the first radially outward facing hook and a second radially outward facing hook engaging the first radially inward facing hook; and a bearing arrangement located between the cap and the guide ring; and wherein:

the cap includes one or more first sealing fingers; and the guide ring includes one or more second sealing fingers interspersed with the one or more sealing fingers of the cap to form a labyrinth seal.

12. The MacPherson strut of claim 11, wherein the first radially inward facing hook and the second radially outward facing hook form an outer snap connection extending circumferentially.

13. The MacPherson strut of claim 11, wherein the first radially outward facing hook and the second radially inward facing hook form an inner snap connection extending circumferentially.

14. The MacPherson strut of claim 11, wherein:

the cap comprises a soft part and a hard part bonded to the soft part; and the first radially outward facing hook and at least one sealing lip are formed on the soft part and the first radially inward facing hook is formed on the hard part.

15. The MacPherson strut of claim 11, wherein the bearing arrangement is a ball bearing arrangement.

16. The MacPherson strut of claim 15, wherein the ball bearing arrangement is an angular contact ball bearing arrangement.

17. A strut bearing for MacPherson strut suspensions comprising a cap, a guide ring, and a bearing arrangement located between the cap and the guide ring, wherein the cap comprises a first hook on an inner side in a radial direction of the strut bearing and a third hook on an outer side in the radial direction, and the guide ring comprises a second hook on the inner side engaged with the first hook and a fourth hook on the outer side engaged with the third hook; the first and second hooks form an inner snap connection extending circumferentially, and the third and fourth hooks form an outer snap connection extending circumferentially, and wherein a labyrinth seal is formed by the third and fourth hooks and one or more sealing lips.

* * * * *